(12) United States Patent
Marquardt et al.

(10) Patent No.: US 6,446,500 B1
(45) Date of Patent: Sep. 10, 2002

(54) PEDAL-TRAVEL SENSOR DEVICE

(75) Inventors: Werner-Karl Marquardt, Markgroeningen; Uwe Velte, Ottersweier; Erik Maennle, Oberkirch, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,115

(22) PCT Filed: Dec. 4, 1999

(86) PCT No.: PCT/DE99/03890

§ 371 (c)(1), (2), (4) Date: May 24, 2001

(87) PCT Pub. No.: WO00/64696

PCT Pub. Date: Nov. 2, 2000

(30) Foreign Application Priority Data

Apr. 22, 1999 (DE) .......................................... 199 18 119

(51) Int. Cl.[7] .............................................. G01M 13/00
(52) U.S. Cl. ....................................................... 73/132
(58) Field of Search ............................. 73/1.79, 118.1, 73/132; 340/438

(56) References Cited

U.S. PATENT DOCUMENTS

| | | | | |
|---|---|---|---|---|
| 4,915,075 A | * | 4/1990 | Brown | 123/399 |
| 5,934,152 A | * | 8/1999 | Aschoff et al. | 123/399 |
| 6,070,490 A | * | 6/2000 | Aschoff et al. | 74/513 |
| 6,263,859 B1 | * | 7/2001 | Kalsi | 123/399 |
| 6,295,891 B1 | * | 10/2001 | Velte et al. | 74/513 |
| 6,342,829 B1 | * | 1/2002 | Takagi et al. | 338/139 |

FOREIGN PATENT DOCUMENTS

| | | |
|---|---|---|
| DE | 34 11 455 A1 | 10/1985 |
| DE | 43 31 902 A1 | 3/1995 |
| DE | 44 22 232 A1 | 1/1996 |
| DE | 1 95 36 699 A1 | 4/1997 |
| GB | 2 281 957 B | 4/1997 |

\* cited by examiner

Primary Examiner—Eric S. McCall
(74) Attorney, Agent, or Firm—Ronald E. Greigg

(57) ABSTRACT

In a pedal-travel sensor device with a kick-down mechanism, when the gas pedal is actuated, an electrical signal should be produced at the same time as a clearly perceptible jump in force. The pedal-travel sensor device proposed here is provided with leaf springs (5) which provide electrical contacts. As a result, the production of the electrical signal can occur completely without play and at the same time as the production of the jump in force. The clearly perceptible jump in force is provided by a spring biased detent means. The pedal-travel sensor device is provided for controlling the power of a drive engine of a motor vehicle.

36 Claims, 12 Drawing Sheets

PEDAL-TRAVEL SENSOR DEVICE

CROSS-REFERENCE TO RELATED APPLICATIONS

This application is a 35 USC 371 application of PCT/DE 99/03890 filed on Dec. 4, 1999.

PRIOR ART

The invention relates to a pedal-travel sensor device.

The published, nonexamined German patent disclosure DE 34 11 455 A1 has disclosed a transducer shaft which can be rotated by the accelerator pedal of a motor vehicle counter to a restoring spring device. In order to detect the pedal position, the transducer shaft cooperates with a rotation angle sensor which supplies an electric pedal-travel signal that corresponds to the position of the accelerator pedal and therefore to the desired drive power.

In motor vehicles, in particular in motor vehicles with an automatic transmission, it is frequently necessary when there is a forceful depression of the accelerator pedal for an electrical shifting signal to be produced, particularly so that during the acceleration, the transmission is electrically downshifted by one gear. A corresponding shifting signal is required for this. When there is excessive pressure past a particular rotation angle of the pedal, this shifting signal is produced by means of an electrical switching contact. In order to prevent an undesirable shifting-back, the electrical switching point must be preceded by a mechanical resistance, i.e. a clearly perceptible increase in the reaction force on the accelerator pedal. A switching point of this kind is frequently referred to as kick-down switching. In the patent disclosure cited above, rolling bodies in a guide cage are provided for this purpose, which cooperate with a bearing surface in the housing upon which the path of the rolling bodies is determined and which has ramps disposed at a particular rotation angle. If the rolling bodies, which are prestressed against the bearing surface are moved counter to the initial stress from a first level to a second level via the ramps, then the force increase required for this produces a perceptible mechanical resistance in the pedal, which corresponds to the switching point.

The published, nonexamined German patent disclosure DE 43 31 902 A1 and the British patent GB 2 281 957 likewise have disclosed a pedal-travel sensor device with the so-called kick-down embodiment.

The published, nonexamined German patent disclosure DE 44 22 232 A1 has also disclosed a pedal-travel sensor device in which an abrupt increase in the pedal force occurs in an intermediate position and in which a shifting signal is produced by a switch at the location with the force increase.

The pedal-travel sensor devices disclosed in the above-mentioned patent disclosures have the disadvantage that the cost for producing these pedal-travel sensor devices is very high and the costs for adjusting the switching point and also for associating the switch with the actuation position having the force increase are high and in spite of this fact, are encumbered with large tolerances.

The published, nonexamined German patent disclosure DE 195 36 699 A1 has disclosed a pedal-travel sensor device with a kick-down mechanism and a switch. The kick-down mechanism and the switch are disposed in a housing which can be very easily connected to the support structure supporting the pedal. As tests of this housing containing the kick-down mechanism and the switch have shown, the association of the switch with the kick-down action point are tied to high costs and considerable switching tolerances in this embodiment as well.

Embodiments have also been proposed in which balls are provided which are loaded radially outward against an adjusting body in a housing by means of a compression spring. In addition, the adjusting body also has a bracket attached to it, which is loaded against two contact strips by means of a spring. Depending on the position of the adjusting body, the bracket comes into contact with the contact strips or the bracket is lifted up from the contact strips. However, this proposed embodiment has the disadvantage that it is quite expensive to produce because a relatively large number of expensive components is required and in particular because the bracket must be guided in a guide provided on the adjusting body. The guide of the bracket has the serious disadvantage that in order to prevent a jamming between the bracket and guide, there must always be play between the bracket and the guide. This play involves very undesirable tolerances in the adjustment of the electrical switching point and these tolerances are unacceptable to many clients.

ADVANTAGES OF THE INVENTION

The pedal-travel sensor device according to the invention has the advantage over the prior art that the cost of manufacturing the force alteration device, in particular the association of the switching point with the force increase in the intermediary position, is quite low and a very precise association of the electrical switching point with the force increase can be achieved. Because it is very insensitive to wear, the association is constant over a very long time. Because there is no friction between the at least one leaf spring and the mounting means or between the least one leaf spring and the actuating member, in particular no friction in a guide, there is also no frictional wear that leads to a switching imprecision. One particular advantage is that the leaf spring does not have to be moved as a whole, but rather the leaf spring can be clamped with one end stationary and as a result, the electrical switching point can be precisely determined.

If the current loop is routed via a total of two leaf springs, then the current loop can advantageously be produced in a particularly simple manner.

If the current loop is embodied so that only one of the two leaf springs lifts up from a contact surface, then this has the advantage that only this one leaf spring has to be precisely dimensioned with regard to its structural length and its adjusting location. Certain tolerances in the other leaf spring therefore have no influence on the electrical switching point.

If the end of the contact surface where the at least one leaf spring protrudes beyond an end edge of the contact surface is provided with a protrusion that projects further in the direction of the leaf spring so that the end region of the leaf spring oriented toward the end edge does not come into direct contact with the end edge of the contact surface, then this has the advantage that because the actuating member is preferably composed of a relatively soft plastic, the leaf spring is protected even in the event of a very frequent switching, which has a favorable influence on the service life of the pedal-travel sensor device as a whole.

The lifting device advantageously achieves the fact that the at least one leaf spring is lifted up from the contact surface or is placed onto the contact surface in a manner that is gentle to the materials. Another advantage is that a friction acts on the end region of the leaf spring oriented toward the contact surface only if the current loop is closed. If the current loop is open, then no friction occurs on the leaf spring, which considerably reduces the wear and tear on the leaf spring and thereby significantly increases the service life of the pedal-travel sensor device.

If the leaf springs and the respectively associated connections are manufactured out of a single piece of material, in particular a thin sheet metal strip, then this has the advantage that particularly few components are required on the whole.

Also the embodiment in which the contact surfaces are provided on the mounting means achieves the advantage that particularly few components—and nevertheless ones which are easy to produce—are required if the electrical connection and the contact surface associated with the connection are made of one piece, in particular stamped, out of a single component, preferably a single sheet metal strip.

If the actuating member support surface is provided on the actuating member and the mounting means support surface is provided on the mounting means, then through the simple insertion of a securing element between the mounting means support surface and the actuating member support surface, the force alteration device can be very simply assembled of only a few easy-to-produce components.

If the securing element is embodied in the form of a clamp, the force alteration device can be assembled very easily and a uniform and symmetrical force distribution is obtained between the mounting means and the actuating member.

If the actuating member is provided with a lateral hole which contains an expanding spring and at least one rolling body, in particular a ball, wherein the rolling body is pressed against the securing element by the expanding spring, then this offers the advantage that the securing element can constitute a step so that during a movement of the actuating member, the rolling body is pushed over the step, thus very easily obtaining a desired, precisely determined jump in force.

BRIEF DESCRIPTION OF THE DRAWINGS

Preferably selected, particularly advantageous exemplary embodiments of the invention are shown in simplified fashion in the drawings and will be explained in detail in the subsequent description.

DESCRIPTION OF THE EXEMPLARY EMBODIMENTS

The pedal-travel sensor device embodied according to the invention can be used to control different drive machines. For example, the drive machine is a spark-ignition engine, whose throttle valve is adjusted with an adjusting motor. In this instance, the pedal-travel sensor device is used, for example, to produce electrical signals which are supplied to the adjusting motor that adjusts the throttle valve. However, it is also possible for the adjustment of the throttle valve to occur mechanically by virtue of the fact that a Bowden cable or cable control is provided, which connects the pedal-travel sensor device to the throttle valve shaft. The drive machine can also, for example, be a diesel engine or an electric motor wherein in these two cases as well, the pedal-travel sensor device produces electrical or mechanical signals which when correspondingly converted, control the power of the drive machine.

The pedal-travel sensor device is preferably disposed directly in the action region of the driver of a motor vehicle. The pedal of the pedal-travel sensor device is preferably the pedal directly actuated by the driver's foot. When particularly necessary, however, it is also easily possible to use simple mechanical means to connect the pedal of the pedal-travel sensor device to a separate gas pedal or another operating lever.

The pedal-travel sensor device is provided with the attribute that in a particular intermediary position of the pedal, a so-called kick-down triggering occurs. The kick-down triggering is intended, for example, to trigger an electrical shifting signal in order to shift an automatic transmission and at the same time, the driver operating the pedal should feel a perceptible force increase when the intermediary position is exceeded, and should also feel a temporary superelevation of force in the intermediary position. The force increase and the force superelevation should occur exactly together with the triggering of the electrical shifting signal.

Figure 1:
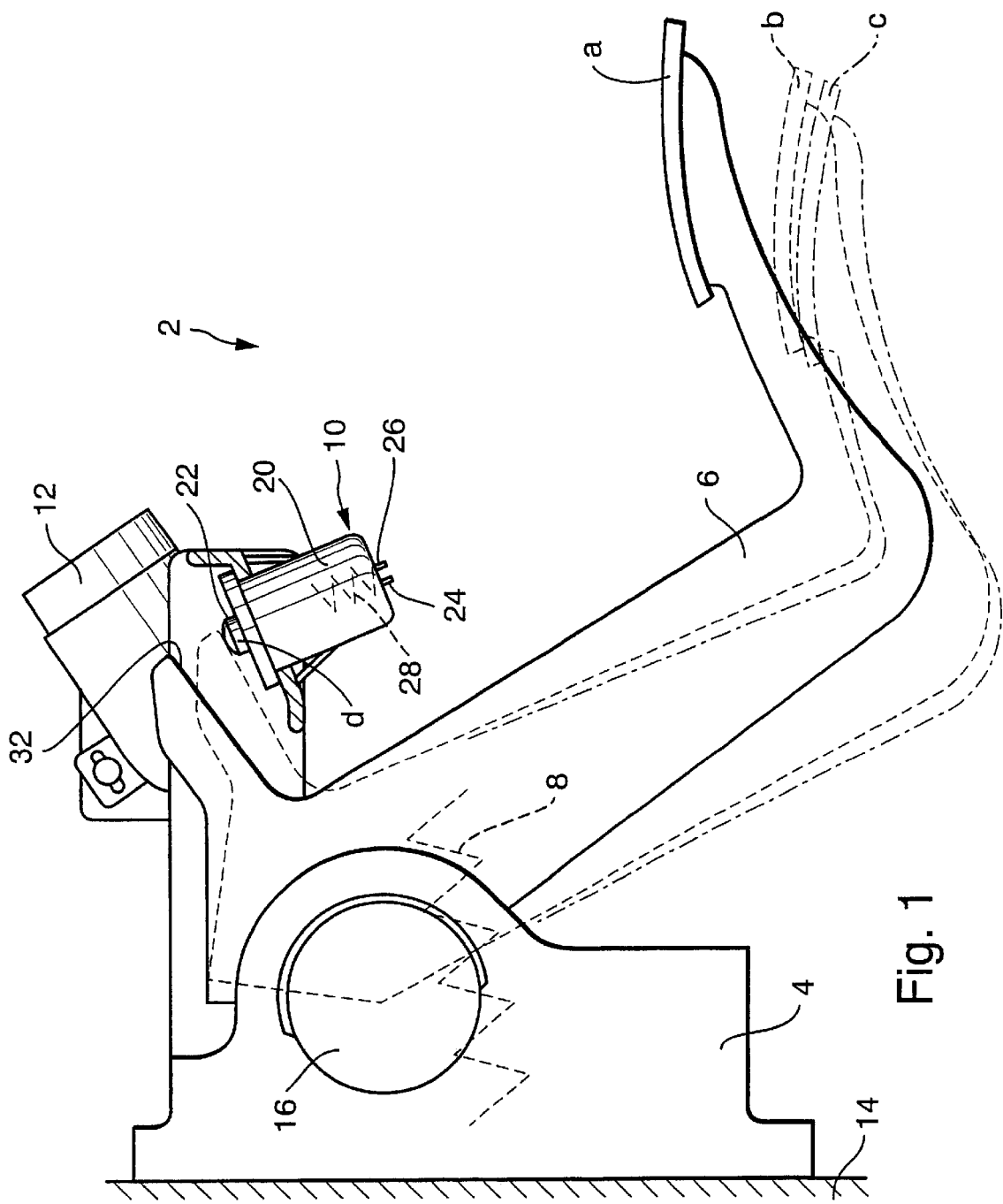
FIG. 1 is a side view of a first exemplary embodiment of the pedal-travel sensor device.

FIG. 1 shows a side view of a first, particularly advantageous, preferably selected exemplary embodiment.

FIG. 1 shows a pedal-travel sensor device 2. The pedal-travel sensor device 2 includes a support structure 4, a pedal 6, a restoring spring device 8, a force alteration device 10, and a sensor 12. The pedal-travel sensor device 2 is fastened to a chassis 14 of a motor vehicle by means of the support structure 4. The pedal 6 is pivotably connected to the chassis 14 by means of the support structure 4 and by means of a pivot bearing 16 provided on the support structure 4. The restoring spring device 8 is disposed inside the support structure 4 and inside the pedal 6. Therefore, the restoring spring device 8 is invisible from the outside and is thus depicted with dashed lines.

When the pedal 6 is not actuated, the restoring spring device 8 assures that the pedal 6 remains in an unactuated end position, which will be referred to below as rest position a. Starting from the rest position a, the pedal 6 can be moved into an end position c through pressure on the pedal 6. A position which will be referred to below as the intermediary position b is disposed between the rest position a and the end position c.

The drawings depict the pedal-travel sensor device 2 and the force alteration device 10 while the pedal 6 is disposed in its rest position a. Also in FIG. 1, a part of the pedal 6 is indicated with dashed lines in the intermediary position b and is also indicated with dot-and-dash lines in the end position c.

The force alteration device 10 is fastened to the chassis 14 by means of the support structure 4. The force alteration device 10 includes a mounting means 20, an actuating member 22, a first electrical connection 24, and a second electrical connection 26. For example, a double-wire electrical line that leads to a set of control electronics is connected to the electrical connections 24, 26. This electrical line and the control electronics are not shown in the drawings for the sake of clarity.

The actuating member 22 is movably supported in the mounting means 20. A cocking spring 28 is provided inside the force alteration device 10. The force of the cocking spring 28 cocks the actuating member 22 in an end position which will be referred to below as stop position d. In the drawings, the actuating member 22 is depicted in its stop position d.

If the pedal 6 is moved between the rest position a and the intermediary position b, then the actuating member 22 is not actuated and is disposed in the depicted stop position d.

If the pedal 6 is actuated beyond the intermediary position b in the direction of the end position c, then a stop 32 provided on the pedal 6 presses against the actuating member 22 and the stop 32 moves the actuating member 22 away from the stop position d counter to the force of the cocking spring 28.

Figure 2:
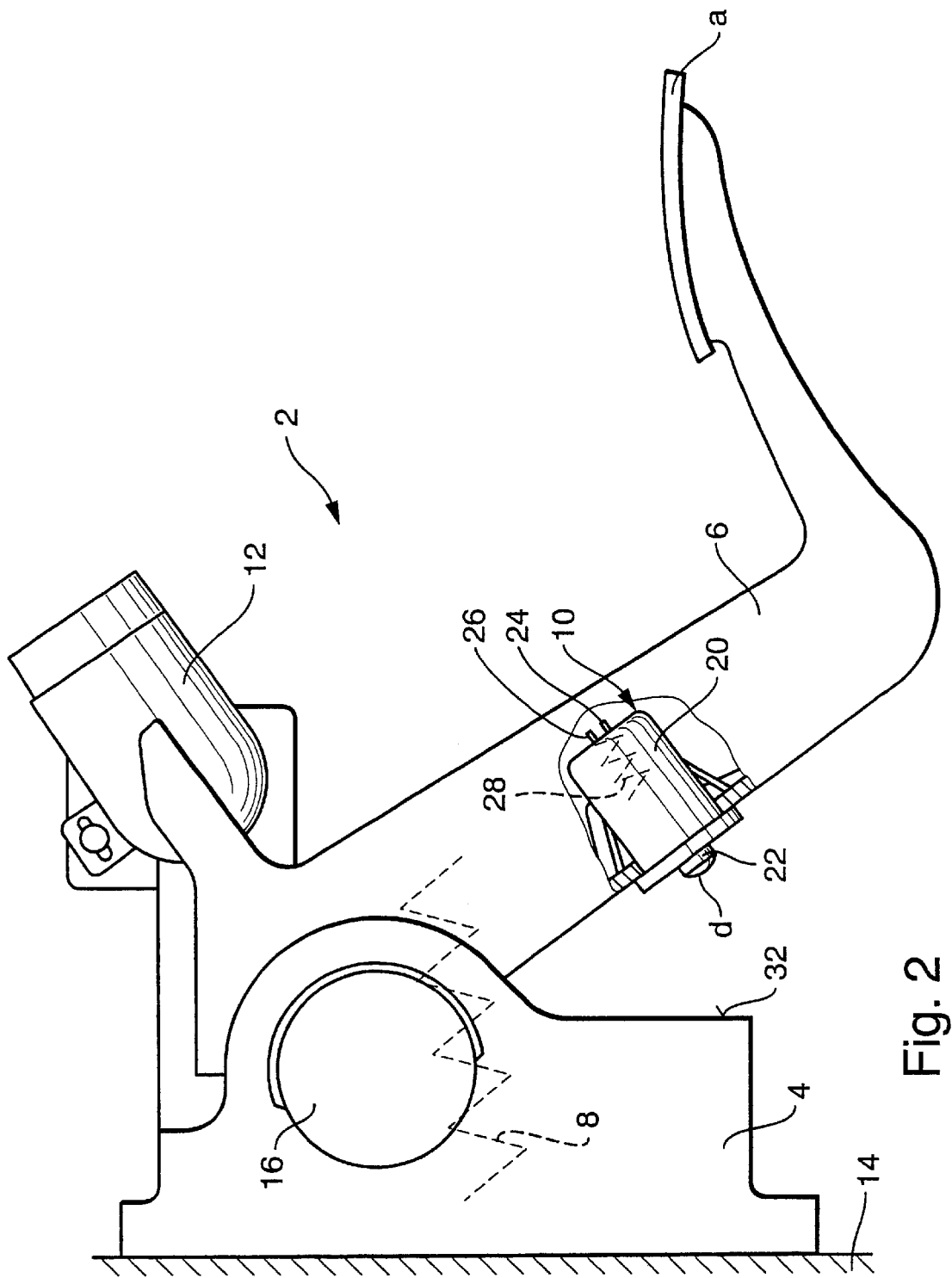
FIG. 2 is a side view of a second exemplary embodiment of the pedal-travel sensor device.

FIG. 2 shows a side view of a second, preferably selected, particularly advantageous embodiment.

In all of the FIGS., parts that are the same or function in the same manner are provided with same reference numerals. Provided that nothing to the contrary is mentioned or is depicted in the drawings, that which is mentioned and depicted in conjunction with one of the FIGS. also applies to the other exemplary embodiments. As long as nothing to the contrary ensues from the explanations, the details of the different exemplary embodiments can be combined with one another.

In contrast to the exemplary embodiment shown in FIG. 1, in the exemplary embodiment shown in FIG. 2, the mounting means 20 of the force alteration device 10 is fastened to the pedal 6 and the stop 32 is provided on the support structure 4 or on the chassis 14.

Also in this exemplary embodiment, the stop 32 presses the actuating member 22 away from the stop position d counter to the force of the cocking spring 28 when the pedal 6 is moved in the range between the intermediary position b and the end position c.

By way of example, FIGS. 3 to 14 show different embodiments of the force alteration device 10 and different details of the force alteration device 10.

By way of example, FIGS. 3 to 8 show a first embodiment of the force alteration device 10.

Figure 3:
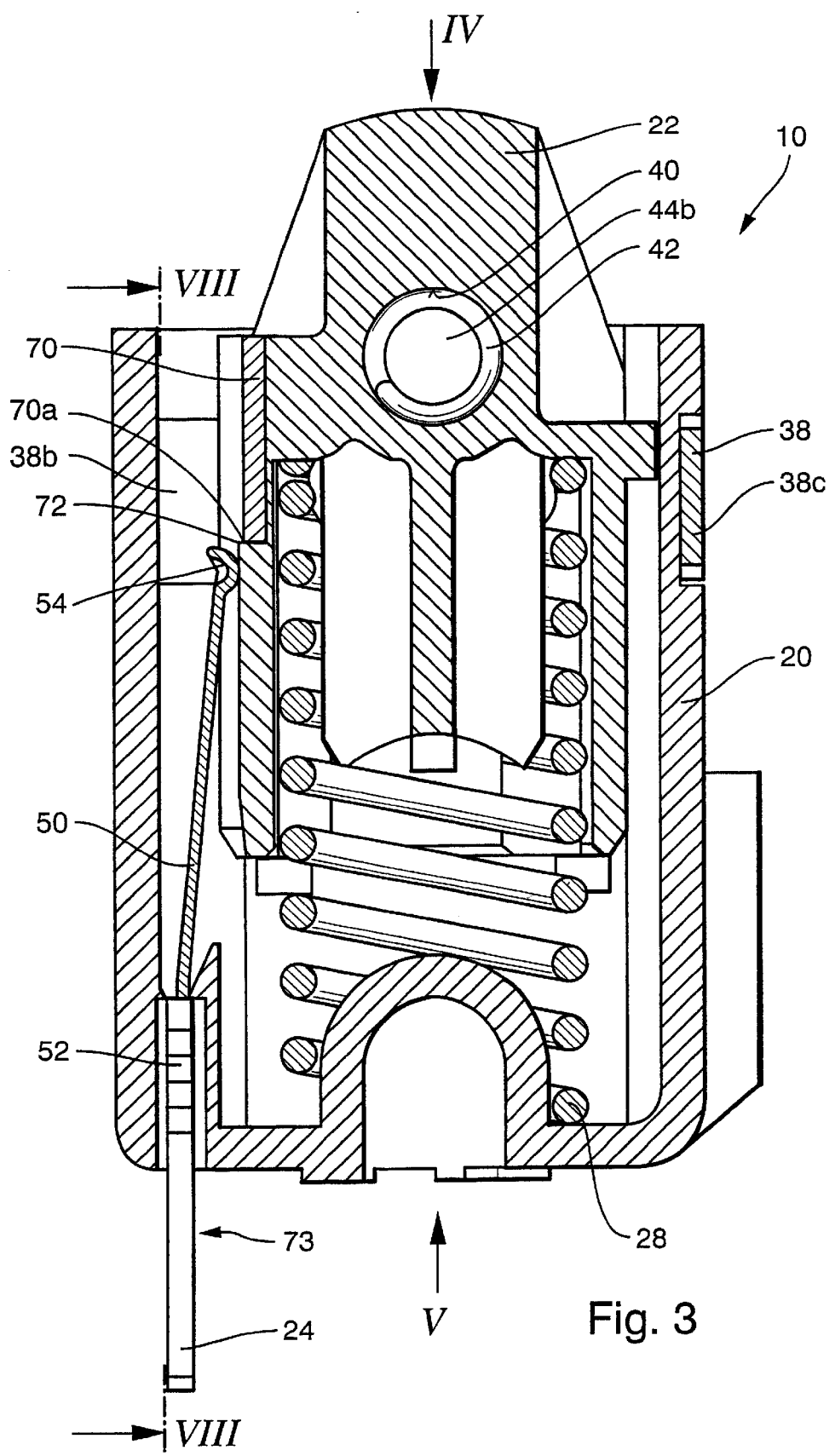
FIG. 3 is a longitudinal section through the force alteration device of the pedal-travel sensor device.
Figure 4:
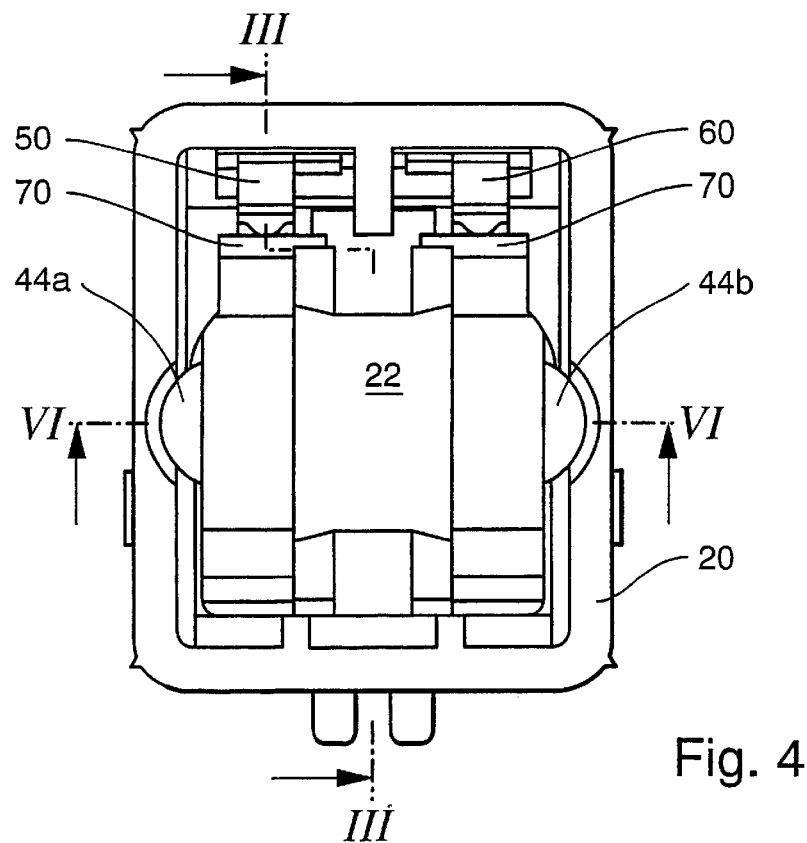
FIG. 4 is an end view of the force alteration device.
Figure 5:
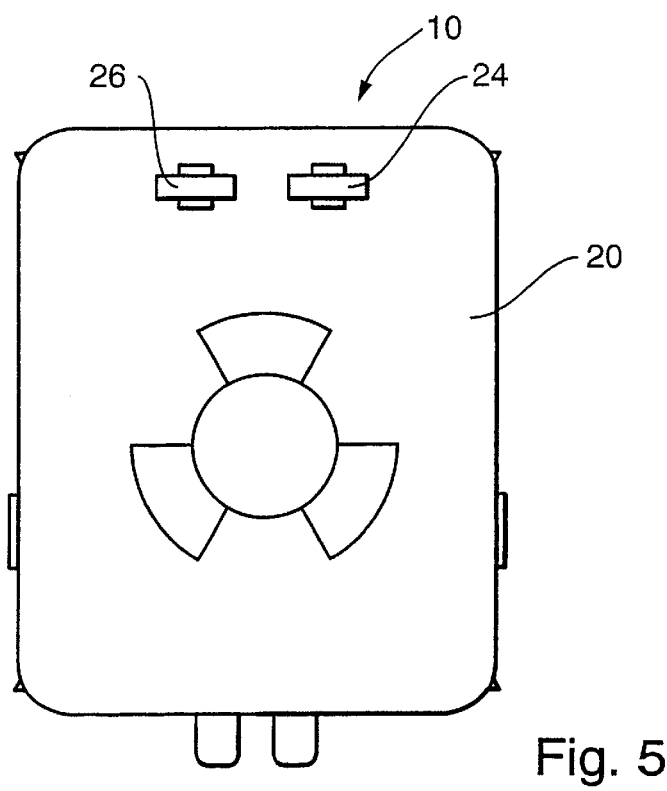
FIG. 5 is a view of another end face of the force alteration device.
Figures 6, 7:
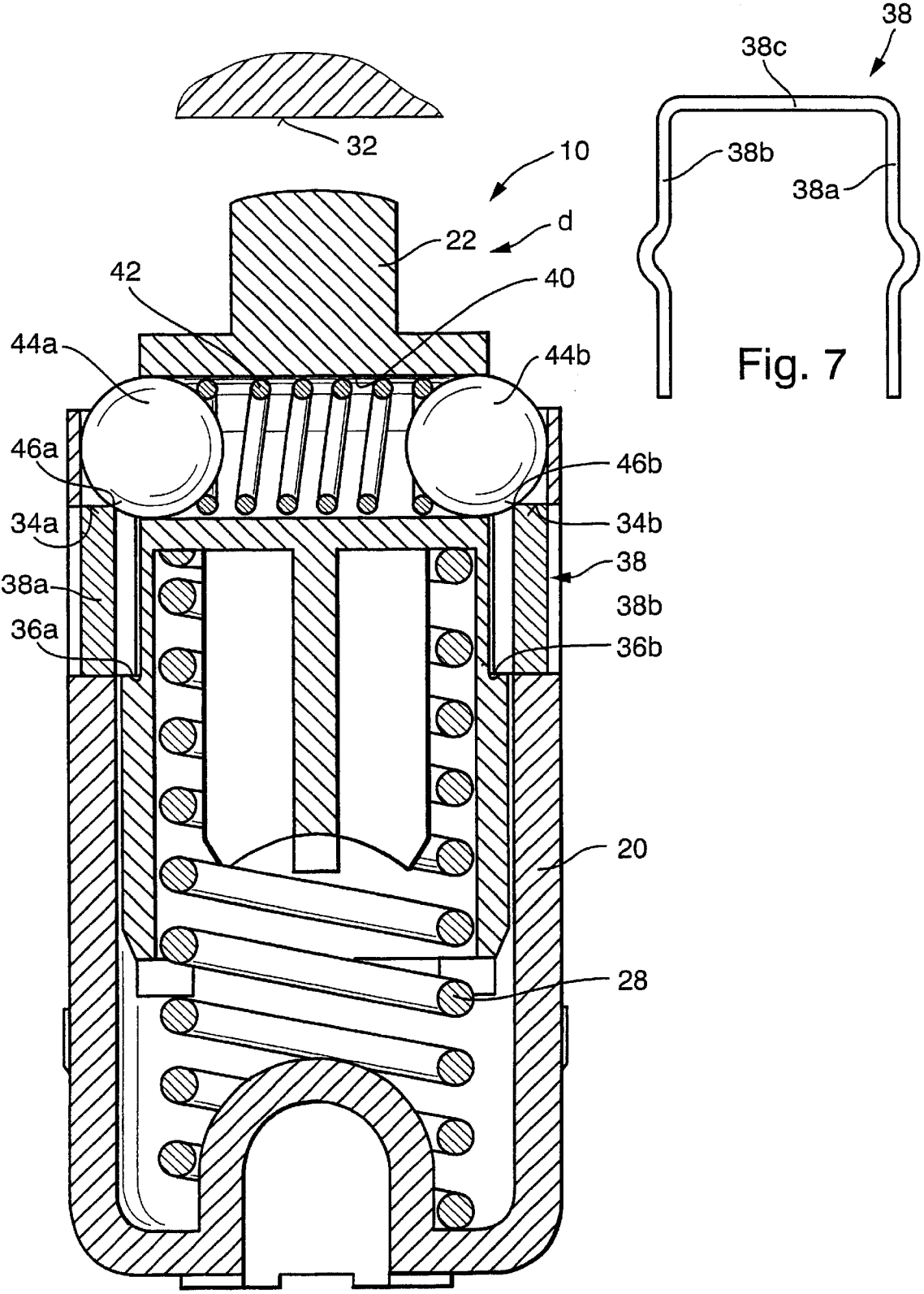
FIG. 6 is another longitudinal section through the force alteration device.
FIG. 7 shows a securing element of the force alteration device.

FIG. 3 is a longitudinal section through the force alteration device 10. The intersecting plane shown in FIG. 3 is marked with III—III in FIG. 4. FIG. 4 is an end view of the force alteration device 10. The viewing direction for the view shown in FIG. 4 is marked with IV in FIG. 3. FIG. 5 shows another end face of the force alteration device 10. The viewing direction for the view shown in FIG. 5 is marked with V in FIG. 3. FIG. 6 is another longitudinal section through the force alteration device 10. The intersecting plane shown in FIG. 6 is marked with VI—VI in FIG. 4.

In all the FIGS., the actuating member 22 is disposed in the so-called stop position d.

As particularly shown by the FIGS. 3 and 6, the actuating member 22 is supported so that it can move in the longitudinal direction inside the mounting means 20. The cocking spring 28 cocks the actuating member 28 in the stop position d. The stop position d is reached very easily in the following manner: the mounting means 20 has a mounting means support surface 34a and a mounting means support surface 34b (FIG. 6). The actuating member 22 has an actuating member support surface 36a and an actuating member support surface 36b (FIG. 6). A securing element 38 is disposed between the mounting means support surfaces 34a, 34b and the actuating member support surfaces 36a, 36b.

As shown in FIG. 7, the securing element 38 is shaped like a clamp. The securing element 38 has a first leg 38a, a second leg 38b, and a connecting piece 38c. When completely installed, the first leg 38a of the securing element 38 is disposed between the mounting means support surface 34a and the actuating member support surface 36a and the second leg 38b of the securing element is disposed between the mounting means support surface 34b and the actuating member support surface 36b. As shown in FIG. 7, the legs 38a and 38b of the securing element 38 are embodied as wave-shaped so that a certain radial spring action is produced and the legs 38a and 38b are thereby assured of having a sufficient degree of contact with the mounting means support surfaces 34a, 34b and the actuating member support surfaces 36a, 36b. Before the securing element 38 is slid into the force alteration device 10, the actuating member 22 can be very easily inserted into the mounting means 20. By means of slight axial pressure on the actuating member 22 counter to the force of the cocking spring 28, the actuating member 22 is pressed into the mounting means 20 until the securing element 38 can be very easily slid into the force alteration device 10 from the side, i.e. between the mounting means support surfaces 34a, 34b and the actuating member support surfaces 36a, 36b. After the securing element 38 is slid between the support surfaces 34a, 34b, 36a, 36b, the securing element 38 secures the actuating member 22 in the stop position d. However, if a sufficient force is exerted on the actuating member 22, then the actuating member 22 is moved away from the stop position d. The actuating member 22 is axially pushed into the available space in the mounting means 20. As a result, the actuating member support surfaces 36a, 36b lift away from the securing element 38.

A lateral bore 40 extends through the actuating member 22 lateral to the actuating direction of the actuating member 22. An expanding spring 42 is disposed in the lateral bore 40. For example, the expanding spring 42 is a helically wound compression spring, but can also be a leaf spring bent into a U shape, for example. A first rolling body 44a and a second rolling body 44b are disposed at the ends of the lateral bore 40. The rolling bodies 44a, 44b are preferably balls, but can also be cylindrical rollers, for example. The rolling bodies 44a, 44b protrude laterally out from the lateral bore 40. It is also possible to embody the lateral bore 40 as a blind hole and to provide a rolling body only at the open end of the lateral bore so that in all, only a single roller body is required.

The expanding spring 42 loads the two roller bodies 44a, 44b radially outward, lateral to the actuating direction of the actuating member 22. The leg 38a of the securing element 38 has an edge which constitutes a step 46a that must be surmounted by the rolling body 44a when the actuating member 22 is moved away from the stop position d. The leg 38b of the securing element 38 also has an edge which constitutes a step 46b that must be surmounted by the rolling body 44b when the actuating member 22 is moved away from the stop position d. If the actuating member 22 is moved away from the stop position d, then the rolling bodies 44a, 44b must be pushed over the steps 46a, 46b counter to the force of the expanding spring 42. As a result, in a movement of the actuating member 22 away from the stop position d, in addition to the force of the cocking spring 28, an additional force is produced which is relatively high, but only occurs for a short part of the actuation of the actuating member 22. This results in the fact that when the pedal 6 is actuated beyond the intermediary position b in the direction of the end position c, the force for actuating the pedal 6 first increases sharply immediately after the intermediary position b due to the additional force of the cocking spring 28 and because the rolling bodies 44a, 44b must be pushed past the steps 46a, 46b counter to the force of the expanding spring 42. This results in the fact that the driver operating the pedal 6 can notice a desirable, clearly perceptible action point. This action point can be referred to as a kick-down action point, which is produced by means of the force alteration device 10. As soon as the rolling bodies 44a, 44b are pushed over the steps 46a, 46b, the rolling bodies 44a, 44b slide along the legs 38a, 38b of the securing element 38 so that after the steps 46a, 46b have been surmounted, the force alteration device 10 only acts with the force of the cocking spring 28 and with the friction between the rolling bodies 44a, 44b and the securing element 38. Between the intermediary position b and the end position c, the force alteration device 10 acts in addition to the force of the restoring spring device 8.

The actuating member 22 and the mounting means 20 are comprised of an easy-to-shape plastic so that these components are very inexpensive to produce. The rolling bodies 44a, 44b and the securing element 38 are comprised of a relatively hard material so that the force that is adjusted is assured over the entire service life of the force alteration device 10 without having to reckon with this force changing over the course of time.

The electrical connections 24 and 26 of the force alteration device 10 are cast into the mounting means 20, wherein the connections 24, 26 protrude from the mounting means 20 at both ends. These ends are formed so that they can be used as plug connector pins in order to electrically couple an electrical connection not shown to a control device not shown. The inward-pointing end of the electrical connection 24 has the form of a leaf spring 50. The leaf spring 50 has a first end region 52, which leads to the connection 24 and which, together with this electrical connection 24, is affixed to the mounting means 20. The fixed connection suitably occurs by casting the end region 52 of the leaf spring 50 into the plastic of the mounting means 20. The leaf spring 50 and the electrical connection 24 protruding out from the mounting means 20 have preferably been stamped out of a thin piece of sheet metal so that they are connected to each other. In order to increase the stability of the connection 24 protruding from the mounting means 20, this part of the piece of sheet metal is folded over at its protruding end so that the protruding connection 24 has twice the thickness of the piece of sheet metal, which can considerably increase the stability. Inside the mounting means 20, the single wall thickness of the thin piece of sheet metal is sufficient. The leaf spring 50 has a second end region 54 that is bent slightly inward radially toward the actuating member 20. The installation conditions for the leaf spring 50 are such that the leaf spring 50 is elastically deflected slightly so that the end region 54 is loaded with elastic initial stress against the actuating member 22.

Figure 8:
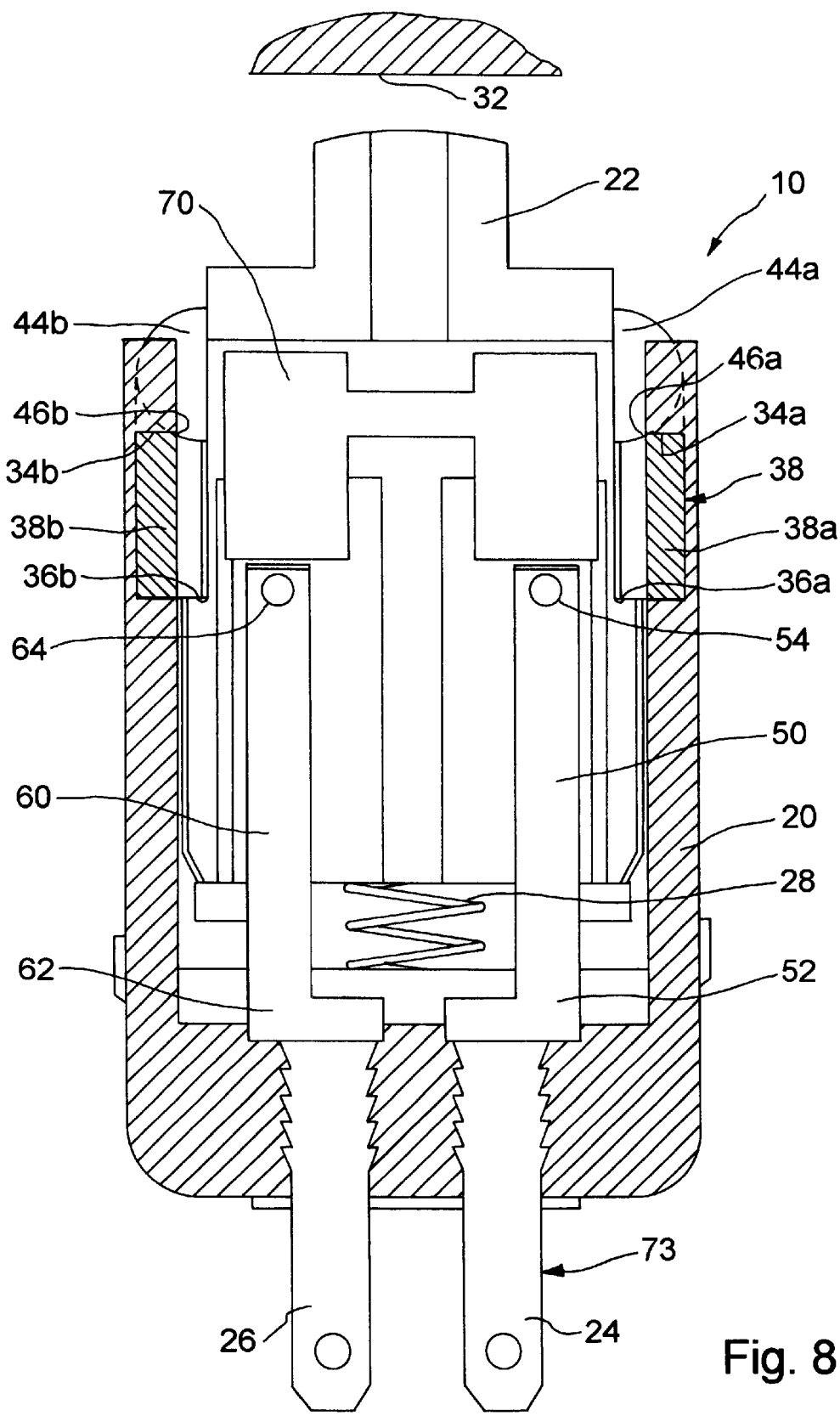
FIG. 8 is another longitudinal section through the force alteration device.

FIG. 8 shows a view of an intersecting plane marked with VIII—VIII in FIG. 3.

A second leaf spring 60 is disposed parallel to the leaf spring 50. The second leaf spring 60 is embodied identically to the first leaf spring 50. The second leaf spring 60 has a first end region 62 that is fixed to the housing and is connected to the second electrical connection 26 and a second end region 64 that is elastically loaded against the surface of the actuating member 22. The leaf spring 60 is formed onto the second electrical connection 26 and is of one piece with it.

A contact surface 70 with favorable electrical conductivity is affixed to the actuating member 22 on its surface oriented toward the leaf springs 50, 60. The contact surface 70 is connected to the actuating member 22. The contact surface 70 is dimensioned with sufficient length that when the actuating member 22 is disposed in the unactuated stop position d, the end region 54 of the leaf spring 50 and the end region 64 of the leaf spring 60 rest against the actuating member 22 outside the contact surface 70. The contact surface 70 has an end edge 70a, which is surmounted by the end regions 54, 64 of the leaf springs 50, 60 when the actuating member 22 is actuated. The contact surface 70 is recessed somewhat into the surface of the actuating member 22 and the thickness of the contact surface 70 is dimensioned so that a projection 72 is produced at the end edge 70a oriented toward the actuating member 22. The projection 72 protrudes beyond the surface of the contact surface 70 in the direction of the leaf spring 50. This results in the fact that with an actuation of the actuating member 22, the end regions of the leaf springs 50, 60 do not strike against the relatively hard end edge 70a of the contact surface 70, but rather strike against only the projection 72, which is comprised of the same relatively soft material as the actuating member 22, preferably plastic. This achieves a considerably gentle treatment of the end regions 54, 64 of the leaf springs 50 and 60.

When the actuating member 22 is disposed in its unactuated stop position d, as shown in FIG. 3, 6, and 8, the force alteration device 10 does not produce an electrical connection between the electrical connection 24 and electrical connection 26. Only when the actuating member 22 has been moved counter to the force of the cocking spring 28 until the end regions 54 and 64 contact the contact surface 70 is a resulting electrical current loop 73 closed (FIG. 8). The electrical current loop 73 connects the two connections 24 and 26 to each other via the leaf springs 50, 60 and the contact surface 70. When the actuating member 22 is in such a position that the leaf springs 50 and 60 do not electrically contact the contact surface 70, then the current loop 73 is open and the actuating member 22 is disposed in a region that will be referred to below as the open position range of the actuating member 22. In principle, it is sufficient for the open position range if even only one of the two leaf springs 50, 60 has lifted up from the contact surface. If the actuating member 22 is disposed in a region in which both of the leaf springs 50 and 60 electrically contact the contact surface 70, then the actuating member 22 is disposed in a region in which the electrical current loop 73 is closed. This region will be referred to below as be closed position range of the actuating member 22.

Figure 9:
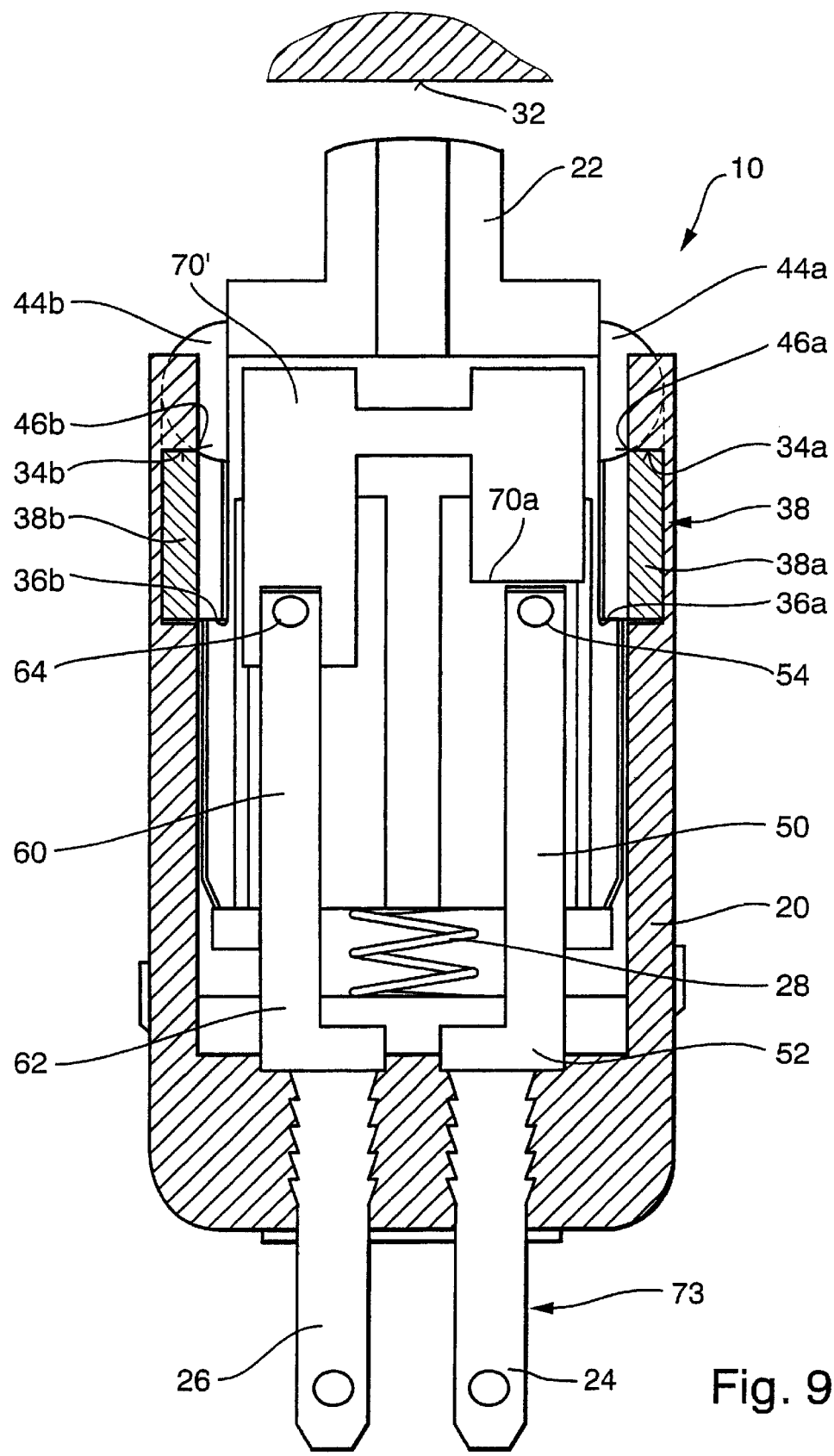
FIG. 9 is a longitudinal section through a modified exemplary embodiment of the force alteration device.

FIG. 9 likewise shows a view of the intersecting plane marked with VIII—VIII in FIG. 3. In comparison to FIG. 8, FIG. 9 shows several exemplary modifications which will be explained below.

In the embodiment shown in FIG. 8, the contact surface 70 is embodied so that when the actuating member 22 is moved from the open position range into the closed position range, both leaf springs 50, 60 come into electrical contact with the contact surface 70 at virtually the same time.

In the modified embodiment shown in FIG. 9, the contact surface 70 (FIG. 8) has been replaced by a contact surface 70' (FIG. 9). The contact surface 70' has a stamped surface that is approximately L-shaped. The contact surface 70' is formed so that the leaf spring 60 remains continuously in contact with the contact surface 70' in every position of the actuating member 22. In the movement of the actuating member 22 from the closed position into the open position, only the leaf spring 50 moves out of electrical contact with the contact surface 70'. In the open position range, the electrical contact is interrupted only between the leaf spring 50 and a contact surface 70'. This has the advantage that only the one leaf spring 50 must be precisely dimensioned. The length of the other leaf spring 60 is of no significance over a wide range of tolerances. As a result, the cost of producing the force alteration device 10 is significantly reduced.

Figure 10:
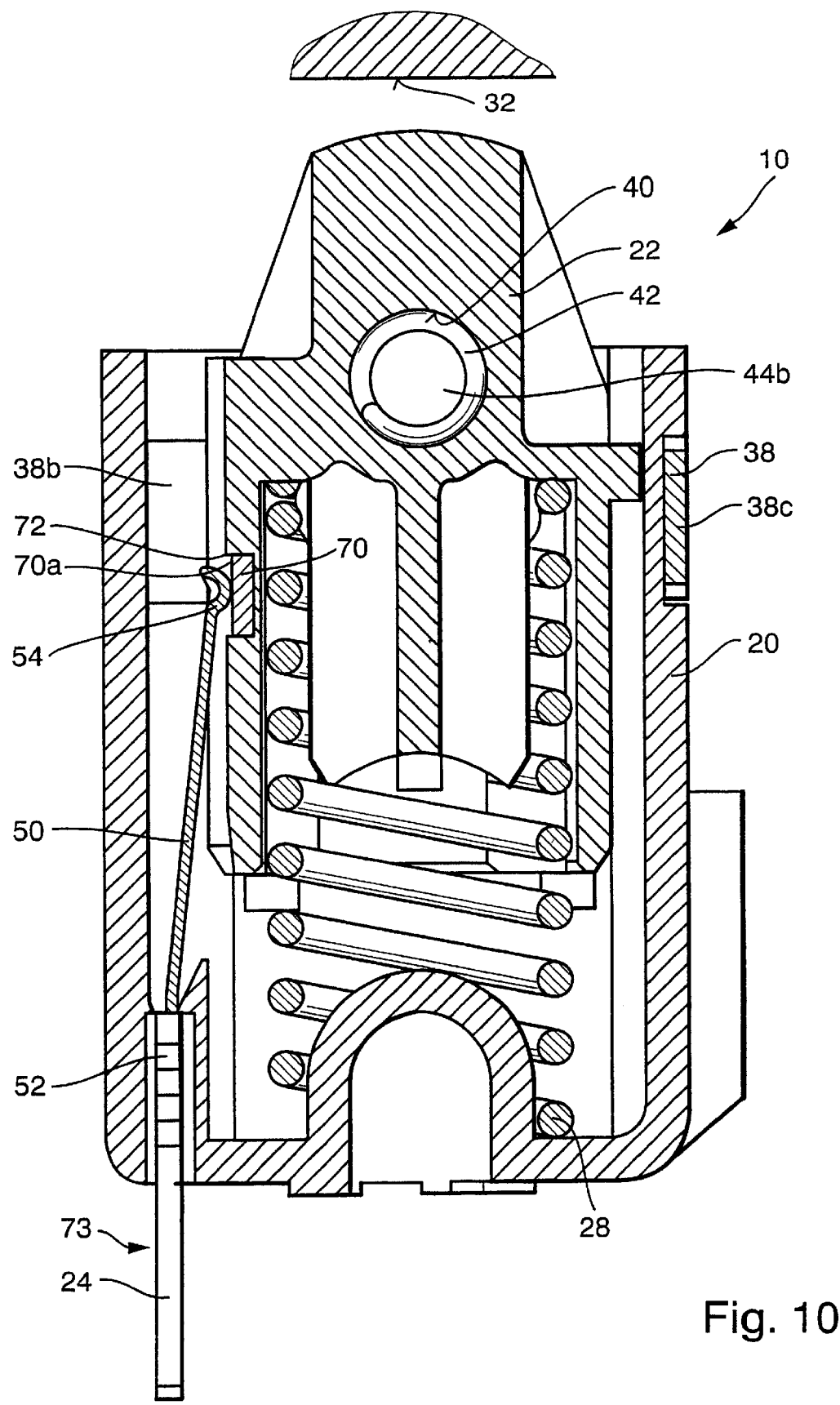
FIG. 10 is a longitudinal section through another modified exemplary embodiment of the force alteration device.

FIG. 10 depicts another particularly advantageous, preferably selected exemplary embodiment.

In the exemplary embodiment shown in FIG. 3, the actuating member 22 arrives in the closed position range when the actuating member 22 is moved out of the stop position d counter to the force of the cocking spring 28. In contrast to this, in the exemplary embodiment shown in FIG. 10, the current loop 73 is electrically closed when the actuating member 22 is disposed in the stop position d. When the actuating member 22 is moved counter to the force of the cocking spring 28, the leaf spring 50 surmounts the projection 72. As a result, the current loop 73 is opened and the actuating member 22 arrives in its open position range.

Figure 11:
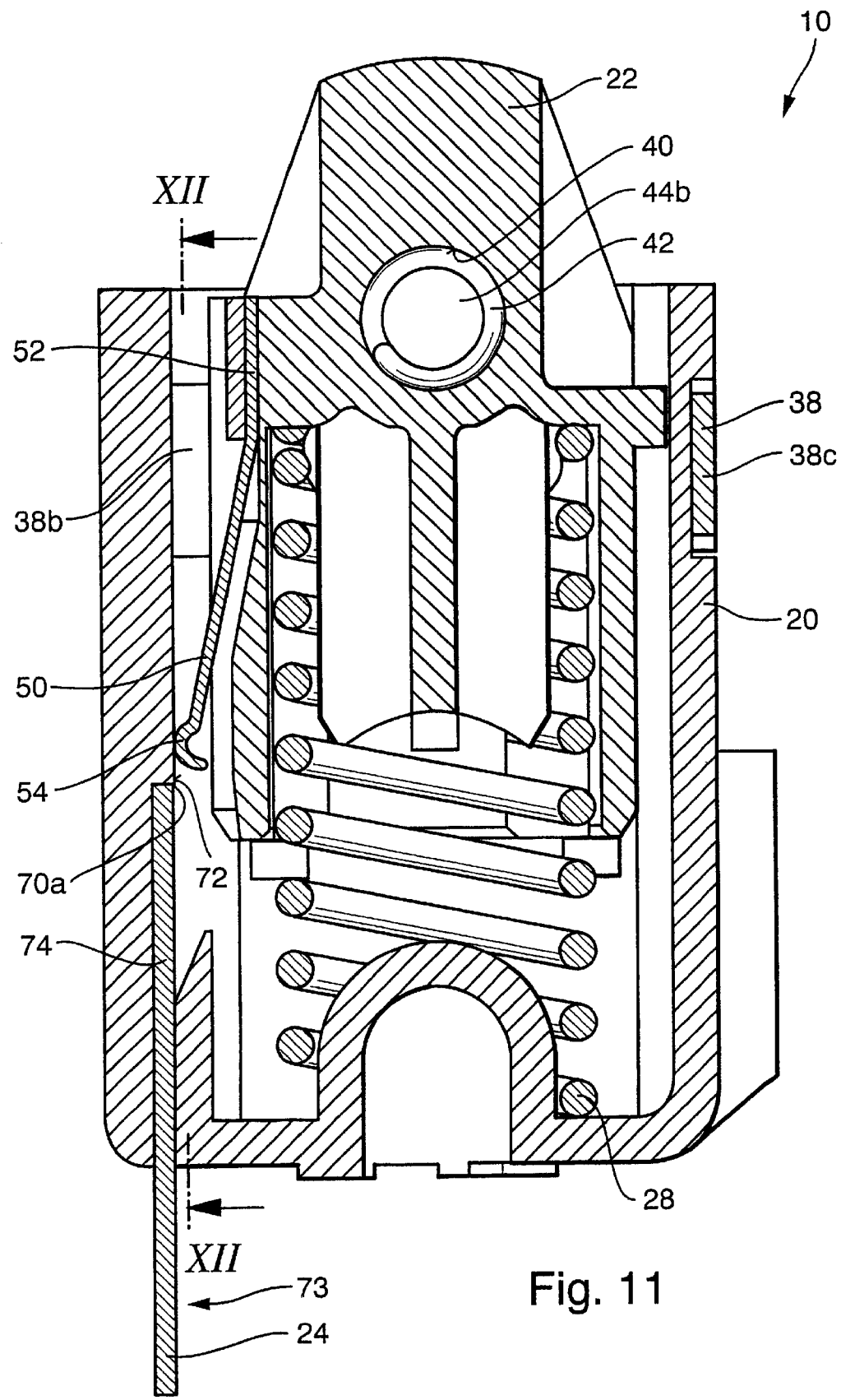
FIG. 11 is a longitudinal section through another exemplary embodiment of the force alteration device.
Figure 12:
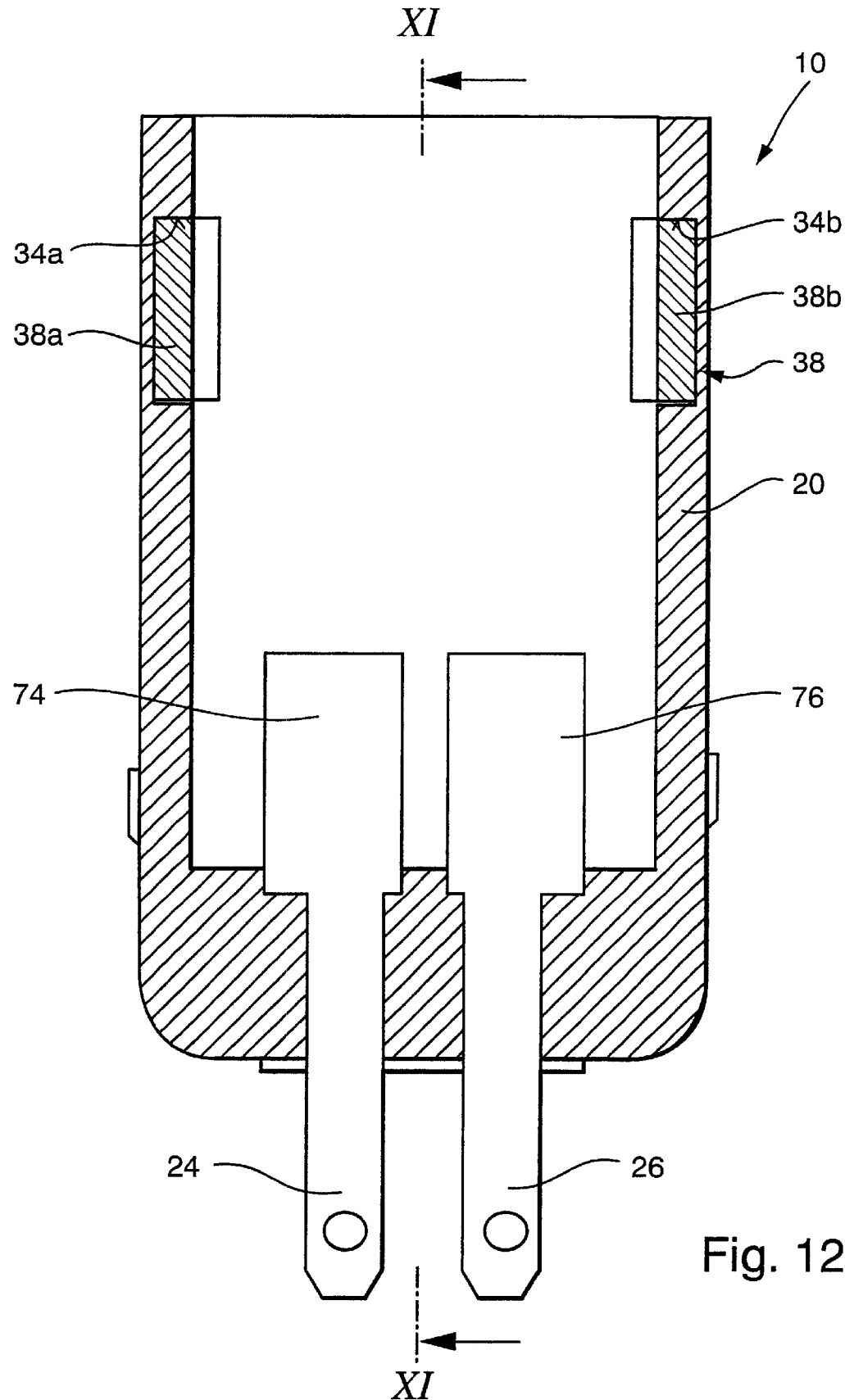
FIG. 12 is another longitudinal section through the additional exemplary embodiment of FIG. 11.

By way of example, FIGS. 11 and 12 depict a particularly advantageous modification of the force alteration device 10.

The intersecting plane shown in FIG. 11 is marked with XI—XI in FIG. 12. The intersecting plane shown in FIG. 12 is marked with XII—XII in FIG. 11.

In exemplary embodiment shown in FIGS. 11 and 12, the end regions 52 and 62 of the two leaf springs 50 and 60 are affixed to the actuating member 22. The two fixed end regions 52 and 62 of the two leaf springs 50 and 60 are securely and permanently connected to each other electrically. A contact surface 74 (FIG. 12) is formed onto the first connection 24 and a second electrical contact surface 76 (FIG. 12) is formed onto the second electrical connection 26. When the actuating member 22 is disposed in its closed position range, then the end region 54 of the leaf spring 50 electrically contacts the contact surface 74 and the end region 64 of the leaf spring 60 electrically contacts the contact surface 76. In the closed position range, the electrical current loop 73 is electrically closed and the connection 24 electrically contacts the second connection 26 by means of the contact surface 74, the resilient end region 54 of the leaf spring 50, the leaf spring 50, the fixed end region 52, the fixed end region 62, the leaf spring 60, the resilient end region 64, and the contact surface 76.

Figure 13:
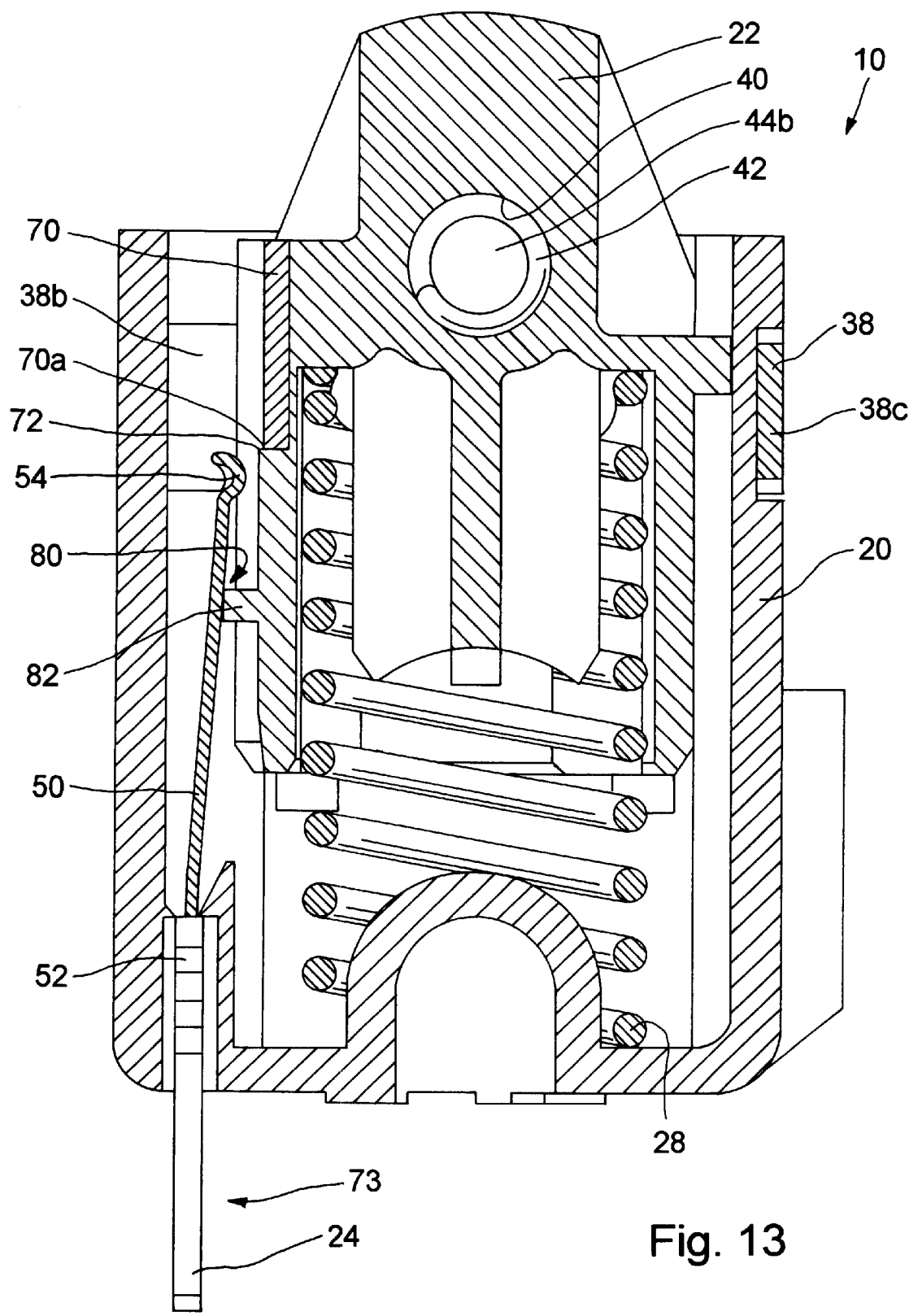
FIG. 13 is a longitudinal section through a modified exemplary embodiment of the force alteration device.

FIG. 13 depicts another particularly advantageous, preferably selected exemplary embodiment.

The exemplary embodiment shown in FIG. 13 largely corresponds to the exemplary embodiment shown in FIG. 3, the difference being that in the exemplary embodiment shown in FIG. 13, a lifting device 80 is also provided.

The lifting device 80 has a protrusion 82 provided on the actuating member 22. The protrusion 82 is provided and dimensioned in such a way that when the actuating member 22 is moved from the closed position range into the open position range, the leaf spring 50 is lifted up from the contact surface 70 before the end region 54 of the leaf spring 50 that electrically contacts the contact surface 70 has reached the end of the contact surface 70. The lifting device 80 thus assures that the end region 54 of the leaf spring 50 does not touch or strike against either the end edge 70a or the projection 72. This results in a very gentle treatment of the leaf springs 50 and 60 which increases their service life significantly.

The lifting device 80 can alternatively also be embodied so that when the actuating member 22 is moved from the closed position range into the open position range, the resilient end region 64 of the second leaf spring 60 is also lifted up from the contact surface 70 by the lifting device 80. In the exemplary embodiment shown in FIG. 13, the projection 72 can be eliminated.

Figure 14:
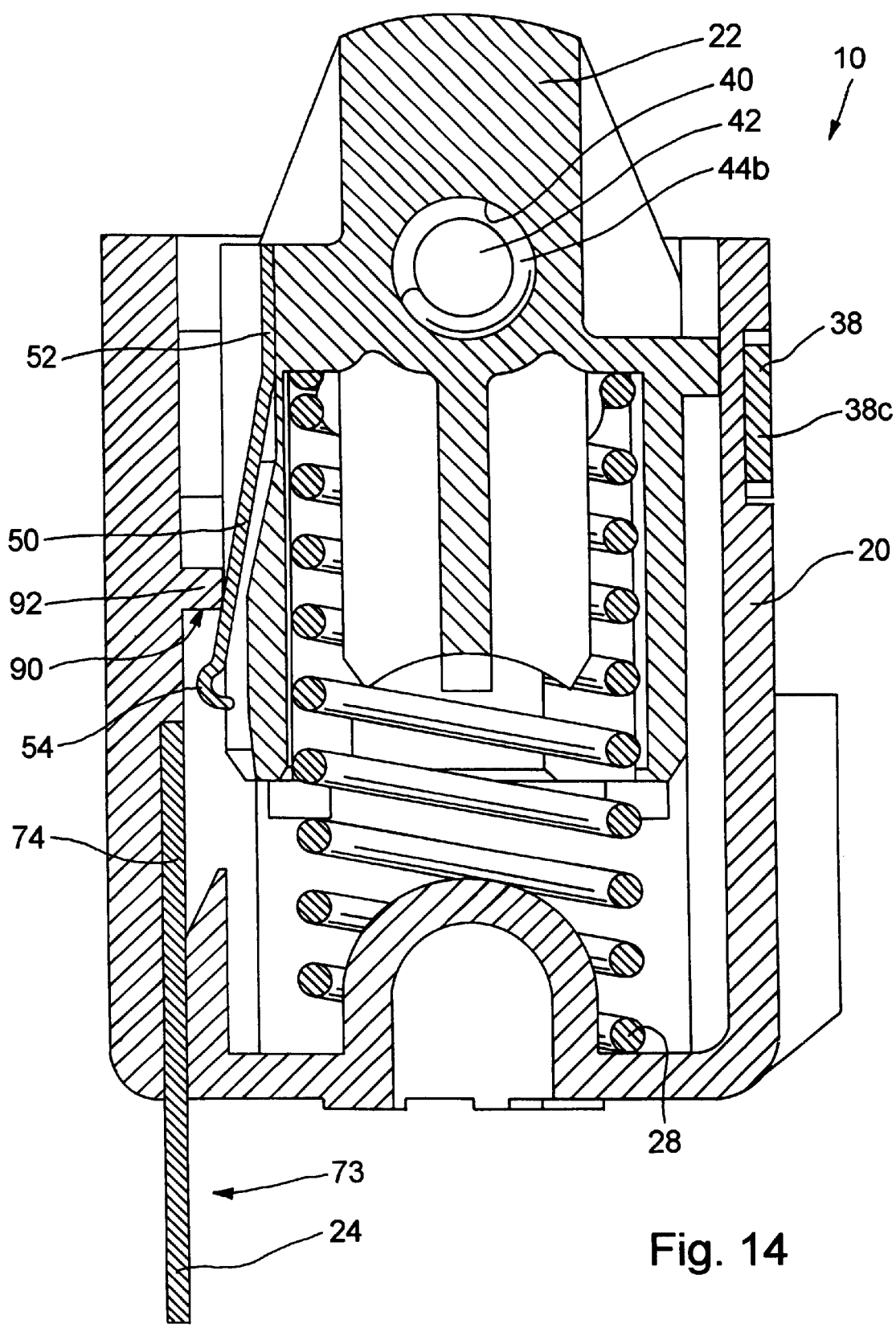
FIG. 14 is a longitudinal section through another exemplary embodiment of the force alteration device.

FIG. 14 depicts another preferably selected, particularly advantageous exemplary embodiment.

FIG. 14 depicts essentially the same thing as FIG. 11, the difference being that in the exemplary embodiment shown in FIG. 14, a lifting device 90 is also provided. The lifting device 90 is essentially constituted by a protrusion 92 provided on the mounting means 80. The protrusion 92 is dimensioned and disposed in such a way that when the actuating member 22 is moved from the closed position range into the open position range, the end region 54 of the leaf spring 50 is lifted up from the contact surface 74 before the leaf spring 50 has reached the end edge of the contact surface 74. When the actuating member 22 is moved from the open position range into the closed position range, the lifting device 90 assures that the end region 54 of the leaf spring 50 is only permitted to drop down onto the contact surface 74 if the end region 54 of the leaf spring 50 is already disposed above the contact surface 74 so that the leaf spring 50 cannot strike either against the end edge of the contact surface 74 or against another protrusion. This significantly increases the service life of the electrical contact between the leaf spring 50 and the contact surface 74. The lifting device 90 can alternatively also be embodied so that when the actuating member 22 is moved from the closed position range into the open position range, the end region 64 of the second leaf spring 60 is thus also lifted up from a contact surface 76 in a manner that is gentle to the contact.

The foregoing relates to preferred exemplary embodiments of the invention, it being understood that other variants and embodiments thereof are possible within the spirit and scope of the invention, the latter being defined by the appended claims.

We claim:

1. A pedal-travel sensor device having a pedal (6) that is supported on a chassis of a motor vehicle and can be moved between a rest position (a) and an end position (c), having an intermediary position (b) of the pedal (6) disposed between the rest position (a) and the end position (c), having a restoring spring device (8) that biases the pedal (6) in the direction of the rest position (a), having a force alteration device (10), wherein the force alteration device (10) includes a mounting means (20), an actuating member (22) movably supported in the mounting means (20), and a cocking spring (28) that biases the actuating member (22) into a stop position (d), wherein when the pedal (6) is moved between the rest position (a) and the intermediary position (b), the actuating member (22) is held in the stop position (d) by the cocking spring (28) and when the pedal (6) is moved between the intermediary position (b) and the end position (c), the pedal (6) moves the actuating member (22) from the stop position (d) counter to the cocking spring (28), wherein the force alteration device (10) is provided with an electrical current loop (73) that extends along the actuating member (22), wherein the actuating member (22) has a closed range of travel in which the electrical loop is closed and an open range of travel in which the electrical loop is interrupted, having an electrically conductive contact surface (70) affixed to the actuating member (22), having a first electrical connection (24) provided on the mounting means (20), having a second electrical connection (26) provided on the mounting means (20), having a leaf spring (50) that is provided on the mounting means (20) and electrically contacts the first electrical connection (24), wherein the leaf spring (50) has a first end region (52) and a second end region (54) and the first end region (52) is affixed to the mounting means (20) and the second end region (54) is loaded against the actuating member (22) due to the elastic deflection of the leaf spring (50), wherein in the closed range of travel of the actuating member (22), the electrical current loop (73) connecting the first electrical connection (24) to the second electrical connection (26) is closed because the second end region (54) of the leaf spring (50) contacts the contact surface (70) provided on the actuating member (22) and wherein in the open range of travel of the actuating member (22), the second end region (54) of the leaf spring (50) is out of contact with the contact surface (70, 70').

2. The pedal-travel sensor device according to claim 1, wherein the electrical current loop (73) extends through a second leaf spring (60) electrically connected to the second electrical connection (26), wherein the second leaf spring (60) has a first end region (62) and a second end region (64) and the first end region (62) is affixed to the mounting means (20) and the second end region (64) is loaded against the actuating member (22) due to the elastic deflection of the second leaf spring (60), wherein at least during the closed range of travel of the actuating member (22), the second end region (64) of the second leaf spring (60) contacts the contact surface (70, 70') provided on the actuating member (22).

3. The pedal-travel sensor device according to claim 2, wherein in the open range of travel of the actuating member (22), the second end region (64) of the second leaf spring (60) is out of contact with the contact surface (70).

4. The pedal-travel sensor device according to claim 2, wherein in the open range of travel of the actuating member (22), the second end region (64) of the second leaf spring (60) contacts the contact surface (70').

5. The pedal-travel sensor device according claim 1, wherein the contact surface (70, 70') has an end edge (70a), and the actuating member (22) has a projection (72) that protrudes in a direction which is perpendicular to the contact surface (70, 70') in such a way that when the actuating member (22) is moved from the closed range of travel of the actuating member (22) to the open range of travel of the actuating member (22), the second end region (54) of the leaf spring (50) does not touch the end edge (70a) of the contact surface (70, 70').

6. The pedal-travel sensor device according to claim 1, wherein a lifting device (80, 82) is provided on the actuating member (22) and when the actuating member (22) is moved from the open range of travel of the actuating member (22) to the closed range of travel of the actuating member (22), this lifting device lifts the second end region (54) of the leaf spring (50) up from the contact surface (70, 70') in such a way that the second end region (54) of the leaf spring (50) does not touch any end edge of the contact surface (70, 70').

7. The pedal-travel sensor device according to claim 1, wherein the first leaf spring (50) is formed onto the first electrical connection (24) and is integral with it.

8. The pedal-travel sensor device according claim 1, wherein the mounting means (20) has at least one mounting means support surface (34a, 34b), which mounting member support surface (34a, 34b) is oriented generally counter to the cocking direction, and the actuating member (22) has at least one actuating member support surface (36a, 36b), which actuating member support surface (36a, 36b) is oriented generally in the cocking direction and a securing element (38) is provided on the actuating member (22), wherein the securing element (38) is disposed between the mounting means support surface (34a, 34b) and the actuating member support surface (36a, 36b).

9. The pedal-travel sensor device according to claim 8, wherein the cocking spring (28) biases the actuating member support surface (36a, 36b) of the actuating member (22) in the direction of the securing element (38) and by means of the actuating member support surface (36a, 36b), biases the securing element (38) in the direction of the mounting means support surface (34a, 34b) of the mounting means (20).

10. The pedal-travel sensor device according to claim 1, wherein the actuating member (22) is provided with a lateral bore (40) which contains an expanding spring (42) and a rolling body (44a), wherein the expanding spring (42) has a first end and a second end, and the first end of the expanding spring (42) presses the rolling body (44a) against the securing element (38, 46a).

11. The pedal-travel sensor device according to claim 10, wherein a second rolling body (44b) is disposed in the lateral bore (40) and the second end of the expanding spring (42) presses the second rolling body (44b) against the securing element (38, 46b).

12. The pedal-travel sensor device according to claim 10, wherein the securing element (38) constitutes a step (46a, 46b), wherein when the actuating member (22) is moved, the at least one rolling body (44a, 44b) is pushed over the step (46a, 46b) counter to the force of the expanding spring (42).

13. The pedal-travel sensor device according to claim 11, wherein the securing element (38) constitutes a step (46a, 46b), wherein when the actuating member (22) is moved, the at least one rolling body (44a, 44b) is pushed over the step (46a, 46b) counter to the force of the expanding spring (42).

14. The pedal-travel sensor device according to claim 8, wherein the securing element (38) is embodied in the form of a clamp and has a first leg (38a) and a second leg (38b), wherein the two legs (38a, 38b) are disposed between an actuating member support surface (36a, 36b) and a mounting means support surface (34a, 34b).

15. The pedal-travel sensor device according to claim 1, wherein the force alteration device (10) is affixed to the chassis (14) and when the pedal (6) is moved from the intermediary position (b) to the end position (c), the pedal (6) acts on the actuating member (22).

16. The pedal-travel sensor device according to claim 1, wherein the force alteration device (10) is affixed to the pedal (6) and when the pedal (6) is moved from the intermediary position (b) to the end position (c), the pedal (6) forces the actuating member (22) against the chassis (14).

17. The pedal-travel sensor device according to claim 1, wherein when the actuating member (22) is disposed in the stop position (d), the electrical current loop (73) is open.

18. The pedal-travel sensor device according to claim 1, wherein when the actuating member (22) is disposed in the stop position (d), the electrical current loop (73) is closed.

19. A pedal-travel sensor device having a pedal (6) that is supported on a chassis of a motor vehicle and can be moved between a rest position (a) and an end position (c), having an intermediary position (b) of the pedal (6) disposed between the rest position (a) and the end position (c), having a restoring spring device (8) that biases the pedal (6) in the direction of the rest position (a), having a force alteration device (10), wherein the force alteration device (10) includes a mounting means (20), an actuating member (22) movably supported in the mounting means (20), and a cocking spring (28) that biases the actuating member (22) into a stop position (d), wherein when the pedal (6) is moved between the rest position (a) and the intermediary position (b), the actuating member (22) is held in the stop position (d) by the cocking spring (28) and when the pedal (6) is moved between the intermediary position (b) and the end position (c), the pedal (6) moves the actuating member (22) from the stop position (d) counter to the cocking spring (28), wherein the force alteration device (10) is provided with an electrical current loop (73) that extends over the actuating member (22), wherein the actuating member (22) has a closed range of travel in which the current loop (73) is electrically closed and an open range of travel in which the current loop (73) is electrically interrupted, having an electrically conductive contact surface (74) affixed to the mounting means (20), having a first electrical connection (24) that is provided on the mounting means (20) and is electrically connected to the contact surface (74), having a second electrical connection (26) provided on the mounting means (20), and having a leaf spring (50) that is provided on the actuating member (22), wherein the leaf spring (50) has a first end region (52) and a second end region (54) and the first end region (52) is affixed to the actuating member (22) and the second end region (54) is loaded against the mounting means (20) due to the elastic deflection of the leaf spring (50), wherein in the closed range of travel of the actuating member (22), the electrical current loop (73) connecting the first electrical connection (24) to the second electrical connection (26) is closed because the second end region (54) of the leaf spring (50) contacts the contact surface (74) provided on the mounting means (20) and wherein in the open range of travel of the actuating member (22), the second end region (54) of the leaf spring (50) is out of contact with the contact surface (74).

20. The pedal-travel sensor device according to claim 19, wherein the mounting means (20) is provided with a second contact surface (76) electrically connected to the second electrical connection (26) and the actuating member (22) is provided with a second leaf spring (60) electrically connected to the leaf spring (50), wherein the second leaf spring (60) has a first end region (62) and a second end region (64) and the first end region (62) is affixed to the actuating member (22) and the second end region (64) is loaded against the mounting means (20) due to the elastic deflection of the second leaf spring (60), wherein at least in the closed range of travel of the actuating member (22), the second end region (64) of the second leaf spring (60) contacts the second contact surface (76) provided on the mounting means (22).

21. The pedal-travel sensor device according to claim 20, wherein in the open range of travel of the actuating member (22), the second end region (64) of the second leaf spring (60) has moved out of contact with the second contact surface (76).

22. The pedal-travel sensor device according to claim 20, wherein in the open range of travel of the actuating member (22), the second end region (64) of the second leaf spring (60) contacts the second contact surface (76).

23. The pedal-travel sensor device according claim 19, wherein the contact surface (74) has an end edge (70a), and the mounting means (20) has a projection (92) that protrudes in a direction which is perpendicular to the leaf spring (50) beyond the contact surface (74) in such a way that when the actuating member (22) is moved from the open range of travel of the actuating member (22) into the closed range of travel of the actuating member (22), the second end region (54) of the leaf spring (50) does not touch the end edge (70a) of the contact surface (74).

24. The pedal-travel sensor device according claim 19, wherein a lifting device (90, 92) is provided on the mounting means (20) and when the actuating member (22) is moved from the closed range of travel of the actuating member (22) into the open range of travel of the actuating member (22) of the actuating member (22), this lifting device lifts the second end region (54) of the leaf spring (50) away from the contact surface (74) in such a way that the second end region (54) of the leaf spring (50) does not touch any end edge of the contact surface (74).

25. The pedal-travel sensor device according to claim 20, wherein the first contact surface (74) is formed onto the first electrical connection (24) and is integral with it.

26. The pedal-travel sensor device according to claim 19, wherein the mounting means (20) has at least one mounting means support surface (34a, 34b), which mounting member support surface (34a, 34b) is oriented generally counter to the cocking direction, and the actuating member (22) has at least one actuating member support surface (36a, 36b), which actuating member support surface (36a, 36b) is oriented generally in the cocking direction and a securing element (38) is provided on the actuating member (22), wherein the securing element (38) is disposed between the mounting means support surface (34a, 34b) and the actuating member support surface (36a, 36b).

27. The pedal-travel sensor device according to claim 26, wherein the cocking spring (28) biases the actuating member support surface (36a, 36b) of the actuating member (22) in the direction of the securing element (38) and by means of the actuating member support surface (36a, 36b), biases the securing element (38) in the direction of the mounting means support surface (34a, 34b) of the mounting means (20).

28. The pedal-travel sensor device according to claim 19, wherein the actuating member (22) is provided with a lateral bore (40) which contains an expanding spring (42) and a rolling body (44a), wherein the expanding spring (42) has a first end and a second end, and the first end of the expanding spring (42) presses the rolling body (44a) against the securing element (38, 46a).

29. The pedal-travel sensor device according to claim 28, wherein a second rolling body (44b) is disposed in the lateral bore (40) and the second end of the expanding spring (42) presses the second rolling body (44b) against the securing element (38, 46b).

30. The pedal-travel sensor device according to claim 28, wherein the securing element (38) constitutes a step (46a, 46b), wherein when the actuating member (22) is moved, the at least one rolling body (44a, 44b) is pushed over the step (46a, 46b) counter to the force of the expanding spring (42).

31. The pedal-travel sensor device according to claim 29, wherein the securing element (38) constitutes a step (46a, 46b), wherein when the actuating member (22) is moved, the at least one rolling body (44a, 44b) is pushed over the step (46a, 46b) counter to the force of the expanding spring (42).

32. The pedal-travel sensor device according to claim 26, wherein the securing element (38) is embodied in the form of a clamp and has a first leg (38*a*) and a second leg (38*b*), wherein the two legs (38*a*, 38*b*) are disposed between an actuating member support surface (36*a*, 36*b*) and a mounting means support surface (34*a*, 34*b*).

33. The pedal-travel sensor device according to claim 19, wherein the force alteration device (10) is affixed to the chassis (14) and when the pedal (6) is moved from the intermediary position (b) to the end position (c), the pedal (6) acts on the actuating member (22).

34. The pedal-travel sensor device according to claim 19, wherein the force alteration device (10) is affixed to the pedal (6) and when the pedal (6) is moved from the intermediary position (b) to the end position (c), the pedal (6) forces the actuating member (22) against the chassis (14).

35. The pedal-travel sensor device according to claim 19, wherein when the actuating member (22) is disposed in the stop position (d), the electrical current loop (73) is open.

36. The pedal-travel sensor device according to claim 19, wherein when the actuating member (22) is disposed in the stop position (d), the electrical current loop (73) is closed.

* * * * *